Oct. 24, 1950  F. VAN DE LAAR ET AL  2,527,042

PENDULUM SCALE

Filed July 20, 1948

Inventors
Francis van de Laar
Oscar Adolph Robberts

By Robert E Burns
Attorney

Patented Oct. 24, 1950

2,527,042

UNITED STATES PATENT OFFICE 2,527,042

PENDULUM SCALE

Francis van de Laar and Oscar Adolph Robberts, Amsterdam, Netherlands, assignors to Weegwerktuigenfabriek Alfra, Amsterdam, Netherlands, a company of the Netherlands Application July 20, 1948, Serial No. 39,748
In the Netherlands January 24, 1947

2 Claims. (Cl. 265—62)

The invention relates to transportable weighing machines of the kind having two pendulum weights and especially adapted for weighing heavy loads.

The main object of the invention is to provide for a transportable weighing machine of this kind which when being placed in an oblique position will weigh just as accurately and sensitively as in the normal vertical position without any adjustment being necessary.

Another object of the invention is the provision of a weighing machine which can be subjected to rough transport without any danger of damage by dislocation of movable parts or by an extensive oscillation of the pendulum weights.

A further object of the invention is the provision of means for an easy and accurate adjustment of the pendulum weights.

The novel features, which we consider as characteristic for our invention are set forth in particular in the appended claims. The invention itself, however, together with additional objects and advantages thereof, will be best understood from the following description of a specific embodiment, when read in connection with the accompanying drawings, in which Fig. 1 is a view on front elevation of the pendulum system of the weighing machine, in which view all parts which are not important for a good understanding of the invention have been omitted.

Figure 2:
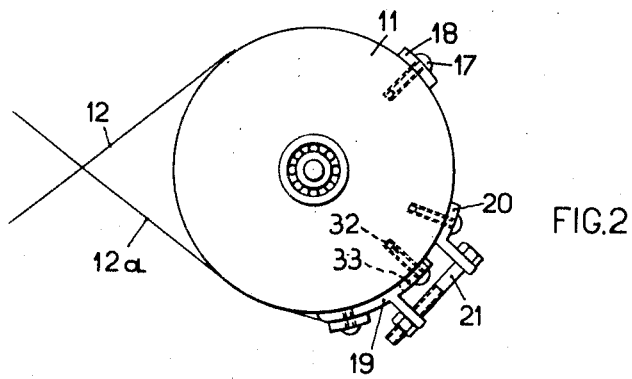

Fig. 2 is a partial view in front elevation, showing the adjusting device for the bands.

Figure 1:
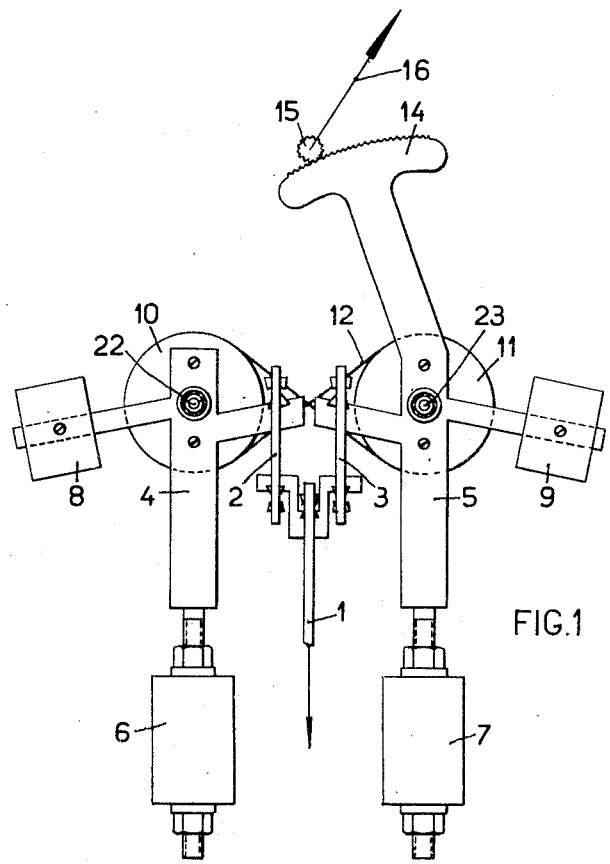

According to Figure 1 the movement of the weighing platform is transmitted to the pendulum arms 4, 5 by means of the rods 1, 2 and 3.

The arms 4, 5 are provided with adjustable pendulum weights 6, 7 and with additional weights 8, 9 for balancing the weight of the rods 1, 2, 3 and of the parts of the machine, e. g. the weighing platform, suspended thereon.

The pendulum arms 4, 5 are rotatably supported in annular bearings 22, 23, preferably ball-bearings.

Discs 10, 11 having their centre in the corresponding axis of rotation are rigidly fixed on the arms 4, 5 and are coupled by means of a crossed band 12, e. g. a steel band. This band is so tightly stretched, that it cannot slide around the discs 10, 11.

If now the weighing machine is placed in an oblique position both pendulum arms will e. g. tend to move to the left. By means of the crossed band 12 the forces causing such a movement will be neutralized, so that the pendulum arms will remain in the initial or normal position. So it is not necessary to readjust the weighing machine before weighing into the normal position again by means of a levelling instrument.

However when the rods 1, 2 and 3 are moved up or down, this movement is transmitted to both pendulum arms in the sense of an adverse rotation.

In consequence of its crossed form the band can now follow the rotation of the discs 10, 11 and the pendulum arms 4, 5 can swing out in accordance with the load. By a toothed sector of arm 5 the movement of the arm is transmitted to a toothed wheel 15 with a pointer 16, indicating the measured weight on a dial.

By preference two separate crossed bands are used, each of which bands being rigidly fixed to the top part of one of the discs and adjustably fixed to the lower part of the second disc.

In Fig. 2 this construction is shown on a larger scale for disc 11.

As shown one end of the band 12 is fixed to the disc 11 by means of a screwbolt 17 with washer 18. The other end of the band 12 is fastened to the disc 10 in the manner shown in Fig. 2 for band 12a on disc 11. This end is connected to a member 19 which is adjustable by means of a screwbolt 21 passing through an angle iron 20 fixed on the disc. The adjustable member can be locked by a bolt 32 passing through a slot in this member. This embodiment simplifies the adjustment of the pendulum arms and makes it easy to stretch the bands sufficiently in order to obtain an efficient coupling of the discs 10, 11.

For this latter purpose and for preventing the dislocation of the arms during transport it is necessary to support the pendulum arms by annular bearings, e. g. ball bearings, and not by knife-edges as usual in weighing machines.

It will be obvious that the machine according to the invention not only assures an accurate weighing in oblique positions, but also that a rough transport of the machine is possible without any danger from swinging out of the pendulum weights causing damage and wear, because the pendulum weights will always remain in the same relative position.

We claim:

1. In a transportable weighing machine, in combination, two pendulum arms, annular bearings supporting said arms, a disc fixed to each of said arms with its center in the axis of rotation of the arm, a crossed band coupling said discs, a load carrying arm laterally projecting from each of said pendulum arms, and a system of pull rods supported by both of said load carrying arms, equally dividing the load between the said load carrying arms.

2. In a transportable weighing machine, in combination, two pendulum arms, annular bearings supporting said arms, a disc connected to each of said arms with its center in the axis of rotation of the arm, crossed band means joining said discs, load carrying means provided on each of said pendulum arms, and a system of pull rods directly supported by both of said load carrying means, equally dividing the load between the said load carrying means.

FRANCIS van de LAAR.
OSCAR ADOLPH ROBBERTS.

REFERENCES CITED

The following references are of record in the file of this patent:

UNITED STATES PATENTS

| Number | Name | Date |
|---|---|---|
| 1,561,621 | Sykes | Nov. 17, 1925 |
| 1,614,726 | Gilbert | Jan. 18, 1927 |
| 1,811,831 | King | June 23, 1931 |
| 2,315,789 | Hadley | Apr. 6, 1943 |
| 2,334,106 | Lewis | Nov. 9, 1943 |
| 2,343,615 | Hurt | Mar. 7, 1944 |

FOREIGN PATENTS

| Number | Country | Date |
|---|---|---|
| 61,626 | Norway | Oct. 23, 1939 |